US009906266B2

(12) United States Patent
Tang et al.

(10) Patent No.: US 9,906,266 B2
(45) Date of Patent: Feb. 27, 2018

(54) FREQUENCY HOPPING PROCESSING METHOD AND APPARATUS

(71) Applicant: Huawei Technologies Co., Ltd., Shenzhen, Guangdong (CN)

(72) Inventors: Zhenfei Tang, Shanghai (CN); Zhongfeng Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/150,711

(22) Filed: May 10, 2016

(65) Prior Publication Data

US 2016/0323011 A1    Nov. 3, 2016

Related U.S. Application Data

(63) Continuation of application No. PCT/CN2013/086824, filed on Nov. 11, 2013.

(51) Int. Cl.
*H04B 1/713* (2011.01)
*H04L 5/00* (2006.01)
*H04W 72/04* (2009.01)

(52) U.S. Cl.
CPC .......... *H04B 1/713* (2013.01); *H04L 5/0053* (2013.01); *H04W 72/042* (2013.01); *H04W 72/0446* (2013.01)

(58) Field of Classification Search
CPC .............................. H04B 1/69; H04B 1/7176; H04B 2001/6908; H04B 1/713; H04L 5/0012; H04L 5/0023; H04L 5/0053

(Continued)

(56) References Cited

U.S. PATENT DOCUMENTS

2005/0025093 A1* 2/2005 Yun .................. H04W 76/02
                                                              370/328
2007/0064730 A1* 3/2007 Jin .................... H04B 1/713
                                                              370/468

(Continued)

FOREIGN PATENT DOCUMENTS

CN    101034912 A    9/2007
CN    101414849 A    4/2009

(Continued)

OTHER PUBLICATIONS

"3rd Generation Partnership Project; Technical Specification Group Radio Access Network; Evolved Universal Terrestrial Radio Access (E-UTRA); Physical channels and modulation (Release 11)", 3GPP TS 36.211 V11.4.0, Sep. 2013, 120 pages.

*Primary Examiner* — Emmanuel Bayard

(57) ABSTRACT

A frequency hopping processing method and apparatus are disclosed, where user equipment receives frequency hopping information, which is sent by a network device, of an extended transmission time interval (TTI); and determines a frequency hopping area of the extended TTI according to the frequency hopping information of the extended TTI. The frequency hopping area of the extended TTI and a frequency hopping area of a normal TTI do not overlap in frequency, and during M-PUSCH frequency hopping of each extended TTI, the user equipment can hop into a corresponding M-PUSCH frequency hopping area according to a preset frequency hopping pattern, and does not hop into a PUSCH frequency hopping area, so that a resource conflict does not exist when M-PUSCH frequency hopping of an extended TTI and PUSCH frequency hopping of a 1 ms TTI are performed at the same time.

14 Claims, 7 Drawing Sheets

(58) Field of Classification Search
USPC .................................................. 375/130–132
See application file for complete search history.

(56) References Cited

U.S. PATENT DOCUMENTS

| | | | |
|---|---|---|---|
| 2007/0218931 A1* | 9/2007 | Beadle | H04B 7/18589 455/502 |
| 2008/0013599 A1* | 1/2008 | Malladi | H04L 5/0007 375/132 |
| 2008/0025285 A1 | 1/2008 | Kwon et al. | |
| 2008/0049690 A1* | 2/2008 | Kuchibhotla | H04W 72/0406 370/338 |
| 2008/0207150 A1* | 8/2008 | Malladi | H04W 52/08 455/127.1 |
| 2010/0046451 A1* | 2/2010 | Tada | H04W 4/10 370/329 |
| 2010/0182972 A1* | 7/2010 | Katayama | H04W 72/048 370/329 |
| 2012/0213146 A1* | 8/2012 | Liu | H04J 11/0053 370/312 |
| 2013/0322493 A1* | 12/2013 | Jersenius | H04W 72/0446 375/133 |
| 2014/0099914 A1* | 4/2014 | Ngai | H04W 24/08 455/405 |
| 2014/0362832 A1* | 12/2014 | Rudolf | H04L 1/1822 370/336 |
| 2015/0296518 A1* | 10/2015 | Yi | H04L 1/08 370/336 |
| 2016/0037550 A1* | 2/2016 | Barabell | H04B 17/318 455/450 |
| 2016/0157287 A1* | 6/2016 | Chae | H04L 5/0023 370/329 |

FOREIGN PATENT DOCUMENTS

| | | |
|---|---|---|
| CN | 103167614 A | 6/2013 |
| CN | 103379635 A | 10/2013 |
| WO | 2008/084977 A2 | 7/2008 |
| WO | 2012/112089 A1 | 8/2012 |
| WO | 2013/138779 A1 | 9/2013 |

* cited by examiner

FREQUENCY HOPPING PROCESSING METHOD AND APPARATUS

CROSS-REFERENCE TO RELATED APPLICATIONS

This application is a continuation of International Application No. PCT/CN2013/086824, filed on Nov. 11, 2013, which is hereby incorporated by reference in its entirety.

TECHNICAL FIELD

Embodiments of the present invention relate to the field of communications technologies, and in particular, to a frequency hopping processing method and apparatus.

BACKGROUND

It should be noted that, frequency-hopping spread spectrum (FHSS) is one of most commonly used spread spectrum manners in wireless communication. The frequency-hopping spread spectrum is a communication manner in which a carrier frequency of a wireless transmission signal of a receiving or transmitting device discretely changes according to a predetermined algorithm or rule. That is, a carrier frequency used in the wireless communication is controlled by pseudo-random change code, and therefore randomly hops. From the perspective of an implementation manner of a communications technology, the frequency-hopping spread spectrum is a communication manner in which multi-frequency frequency-shift keying is performed by using a code sequence, and is also a code controlled carrier frequency hopping communications system. From the perspective of a time domain, a frequency hopping signal is a multi-frequency frequency-shift keying signal. From the perspective of a frequency domain, a spectrum of a frequency hopping signal randomly hops at unequal intervals on a very wide frequency band.

In a Long Term Evolution (LTE) system, a subframe time is a transmission time interval (TTI), where the TTI may be, for example, used to transmit information such as information about a physical uplink control channel (PUCCH) or a physical uplink shared channel (PUSCH). The PUSCH transmits uplink data information, and the PUCCH transmits uplink control information, and the uplink data information and the uplink control information are separately mapped to different resource blocks.

FIG. 1 is a schematic diagram of frequency hopping of a PUCCH and a PUSCH in the prior art. As shown in FIG. 1, the horizontal coordinate is time, unit: a 1 ms TTI; the vertical coordinate is frequency, unit: a resource block (RB). Each resource block occupies, in frequency, only 12 subcarriers, and occupies, in time domain, only one timeslot (Slot). Generally one radio frame in the time domain has a length of 10 ms, and includes 10 subframes, where each subframe is 1 ms, and each subframe includes two timeslots. In existing PUCCH frequency hopping information processing based on the 1 ms TTI, the PUCCH mapped to resource blocks on two sides of a frequency resource, and the PUSCH mapped to a resource block in the middle of the frequency resource. As shown in FIG. 1, an initial location "PUSCH frequency hopping offset" of a PUSCH frequency hopping area is determined by a high-level parameter (for example, pusch-HoppingOffset), and the time unit of frequency hopping is Slot or TTI.

To increase power spectrum density PSD) of a signal, so as to increase system coverage, a narrowband signal transmission technology may be used currently. In the narrowband signal transmission technology, the TTI is greater than 1 ms, where the TTI greater than 1 ms is uniformly referred to as an extended TTI herein, a corresponding slot is referred to as an extended slot, and a subframe greater than 1 ms is referred to as an extended subframe; and generally, the extended TTI may be used to transmit a machine type communication physical uplink shared channel (MTC Physical Uplink Shared Channel, M-PUSCH).

In the existing frequency hopping processing, only frequency hopping of the 1 ms TTI is supported. Therefore, when the M-PUSCH frequency hopping of the extended TTI and the PUSCH frequency hopping of the 1 ms TTI are performed at the same time, a resource conflict may exist, that is, the M-PUSCH frequency hopping and the PUSCH frequency hopping occupy a same resource sometimes. Descriptions are provided by using FIG. 2 as an example; FIG. 2 is a schematic diagram of a resource conflict when M-PUSCH frequency hopping of an extended TTI and PUSCH frequency hopping of a 1 ms TTI are performed at the same time. As shown in FIG. 2, at a $24^{th}$ TTI, a resource conflict exists between the M-PUSCH frequency hopping of the extended TTI and the PUSCH frequency hopping of the 1 ms TTI, thereby affecting subsequent data transmission.

Therefore, in existing frequency hopping processing based on the 1 ms TTI, when the M-PUSCH frequency hopping of the extended TTI and the PUSCH frequency hopping of the 1 ms TTI are performed at the same time, a problem of resource conflict may exist.

SUMMARY

The present invention provides a frequency hopping processing method and apparatus, which can avoid a resource conflict when M-PUSCH frequency hopping of an extended TTI and PUSCH frequency hopping of a 1 ms TTI are performed at the same time.

According to a first aspect, the present invention provides a frequency hopping processing method, including:

receiving, by user equipment, frequency hopping information, which is sent by a network device, of an extended transmission time interval TTI, where the extended TTI is a TTI whose time length is greater than 1 millisecond; and determining, by the user equipment, a frequency hopping area of the extended TTI according to the frequency hopping information of the extended TTI.

Based on the first aspect, in a first possible implementation manner, the frequency hopping information of the extended TTI includes a frequency hopping offset parameter of the extended TTI; and the determining, by the user equipment, a frequency hopping area of the extended TTI according to the frequency hopping information of the extended TTI includes:

determining, by the user equipment, a frequency hopping initial location of the extended TTI according to the frequency hopping offset parameter of the extended TTI;

determining a length of the frequency hopping area of the extended TTI according to a frequency hopping offset parameter of a normal TTI and the frequency hopping offset parameter of the extended TTI, where the normal TTI is a TTI whose time length is equal to 1 millisecond; and determining the frequency hopping area of the extended TTI according to the frequency hopping initial location of the extended TTI and the length of the frequency hopping area of the extended TTI that are determined.

Based on the first aspect, in a second possible implementation manner, the frequency hopping information of the extended TTI includes a length of the frequency hopping area of the extended TTI; and the determining, by the user equipment, a frequency hopping area of the extended TTI according to the frequency hopping information of the extended TTI includes:

determining, by the user equipment, a frequency hopping offset parameter of a normal TTI according to the frequency hopping offset parameter of the normal TTI and the length of the frequency hopping area of the extended TTI, where the normal TTI is a TTI whose time length is equal to 1 millisecond;

determining a frequency hopping initial location of the extended TTI according to a frequency hopping offset parameter of the extended TTI; and determining the frequency hopping area of the extended TTI according to the frequency hopping initial location of the extended TTI and the length of the frequency hopping area of the extended TTI that are determined.

Based on the first aspect, in a third possible implementation manner, the frequency hopping information of the extended TTI includes a frequency hopping offset parameter of the extended TTI and a length of the frequency hopping area of the extended TTI; and the determining, by the user equipment, a frequency hopping area of the extended TTI according to the frequency hopping information of the extended TTI includes:

determining, by the user equipment, a frequency hopping initial location of the extended TTI according to the frequency hopping offset parameter of the extended TTI; and determining the frequency hopping area of the extended TTI according to the frequency hopping initial location of the extended TTI and the length of the frequency hopping area of the extended TTI that are determined.

Based on the first aspect or any one of the first to the third possible implementation manners of the first aspect, in a fourth possible implementation manner, after the determining, by the user equipment, a frequency hopping area of the extended TTI according to the frequency hopping information of the extended TTI, the method further includes:

determining, by the user equipment, a quantity of resource blocks in the frequency hopping area of the extended TTI according to the determined frequency hopping area of the extended TTI and a preset resource block size of the extended TTI; and determining, by the user equipment, numbers of the resource blocks in the frequency hopping area of the extended TTI according to the quantity of the resource blocks in the frequency hopping area of the extended TTI.

Based on the fourth possible implementation manner of the first aspect, in a fifth possible implementation manner, after the determining, by the user equipment, numbers of the resource blocks in the frequency hopping area of the extended TTI, the method includes:

receiving, by the user equipment, a number of a virtual resource block in which frequency hopping of the extended TTI is located; and determining, by the user equipment according to the number of the virtual resource block and a mapping relationship between the number of the virtual resource block and a number of a physical resource block, the number of the physical resource block in which the frequency hopping of the extended TTI is located.

Based on the fifth possible implementation manner of the first aspect, in a sixth possible implementation manner, the determining, by the user equipment according to the number of the virtual resource block and a mapping relationship between the number of the virtual resource block and a number of a physical resource block, the number of the physical resource block in which the frequency hopping of the extended TTI is located includes:

determining, by the user equipment according to the number of the virtual resource block, the quantity of the resource blocks in the frequency hopping area, and a timeslot number of the extended TTI, the number of the physical resource block in which the frequency hopping of the extended TTI is located; or determining, by the user equipment according to the number of the virtual resource block, the quantity of the resource blocks in the frequency hopping area, and a subframe number of the extended TTI, the number of the physical resource block in which the frequency hopping of the extended TTI is located.

Based on the fifth possible implementation manner of the first aspect, in a seventh possible implementation manner, the determining, by the user equipment according to the number of the virtual resource block and a mapping relationship between the number of the virtual resource block and a number of a physical resource block, the number of the physical resource block in which the frequency hopping of the extended TTI is located includes:

determining, by the user equipment according to the number of the virtual resource block, the quantity of the resource blocks in the frequency hopping area, and a first function $f_m(i)$, the number of the physical resource block in which the frequency hopping of the extended TTI is located, where i indicates a subframe number or a timeslot number of the extended TTI, and the first function $f_m(i)$ is a value determined according to the subframe number or a serial number of current transmission.

Based on the seventh possible implementation manner of the first aspect, in an eighth possible implementation manner, the determining, by the user equipment according to the number of the virtual resource block, the quantity of the resource blocks in the frequency hopping area, and a first function $f_m(i)$ the number of the physical resource block in which the frequency hopping of the extended TTI is located, where i indicates a subframe number or a timeslot number of the extended TTI includes:

determining, by the user equipment according to the number of the virtual resource block, the quantity of the resource blocks in the frequency hopping area, the first function $f_m(i)$ a quantity of subbands in the frequency hopping area, and a second function $f_{hop}(i)$, the number of the physical resource block in which the frequency hopping of the extended TTI is located, where i indicates a subframe number or a timeslot number of the extended TTI, and the second function $f_{hop}(i)$ is a value recursively determined according to a pseudo-random sequence.

Based on the first aspect or any one of the first to the third possible implementation manners of the first aspect, in a ninth possible implementation manner, after the determining, by the user equipment, a frequency hopping area of the extended TTI according to the frequency hopping information of the extended TTI, the method further includes:

acquiring, by the user equipment, a first timeslot-lowest physical resource block $n_{PRB}^{S1}(i)$ according to an indication of downlink control information; and determining, according to the first timeslot-lowest physical resource block $n_{PRB}^{S1}(i)$, that a second timeslot-lowest physical resource block is $(\lfloor N_{RB}^{sb}/2 \rfloor + n_{PRB}^{S1}(i)) \bmod N_{RB}^{sb}$, where $$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases};$$

and $N_{RB}^{HO}=0$, where $N_{RB}^{UL}$ is a quantity of resource blocks in the frequency hopping area of the extended TTI, $N_{sb}$ is a quantity of subbands in the frequency hopping area of the extended TTI, and $N_{RB}^{sb}$ is a quantity of narrowband resource blocks of one subband in the frequency hopping area of the extended TTI.

According to a second aspect, a frequency hopping processing method is provided, including:

determining, by a network device, frequency hopping information of an extended transmission time interval TTI of user equipment, where the extended TTI is a TTI whose time length is greater than 1 millisecond;

sending, by the network device, the frequency hopping information of the extended TTI to the user equipment; and determining, by the network device, a frequency hopping area of the extended TTI of the user equipment according to the frequency hopping information of the extended TTI.

Based on the second aspect, in a first possible implementation manner, the frequency hopping information of the extended TTI includes a frequency hopping offset parameter of the extended TTI; and the determining, by the network device, a frequency hopping area of the extended TTI of the user equipment according to the frequency hopping information of the extended TTI includes:

determining, by the network device, a frequency hopping initial location of the extended TTI according to the frequency hopping offset parameter of the extended TTI;

determining a length of the frequency hopping area of the extended TTI according to a frequency hopping offset parameter of a normal TTI and the frequency hopping offset parameter of the extended TTI, where the normal TTI is a TTI whose time length is equal to 1 millisecond; and determining the frequency hopping area of the extended TTI according to the frequency hopping initial location of the extended TTI and the length of the frequency hopping area of the extended TTI that are determined.

Based on the second aspect, in a second possible implementation manner, the frequency hopping information of the extended TTI includes a length of the frequency hopping area of the extended TTI; and the determining, by the network device, a frequency hopping area of the extended TTI of the user equipment according to the frequency hopping information of the extended TTI includes:

determining, by the network device, a frequency hopping offset parameter of a normal TTI according to the frequency hopping offset parameter of the normal TTI and the length of the frequency hopping area of the extended TTI, where the normal TTI is a TTI whose time length is equal to 1 millisecond;

determining a frequency hopping initial location of the extended TTI according to a frequency hopping offset parameter of the extended TTI; and determining the frequency hopping area of the extended TTI according to the frequency hopping initial location of the extended TTI and the length of the frequency hopping area of the extended TTI that are determined.

Based on the second aspect, in a third possible implementation manner, the frequency hopping information of the extended TTI includes a frequency hopping offset parameter of the extended TTI and a length of the frequency hopping area of the extended TTI; and the determining, by the network device, a frequency hopping area of the extended TTI of the user equipment according to the frequency hopping information of the extended TTI includes:

determining, by the network device, a frequency hopping initial location of the extended TTI according to the frequency hopping offset parameter of the extended TTI; and determining the frequency hopping area of the extended TTI according to the frequency hopping initial location of the extended TTI and the length of the frequency hopping area of the extended TTI that are determined.

Based on the second aspect or any one of the first to the third possible implementation manners, in a fourth possible implementation manner, after the determining, by the network device, a frequency hopping area of the extended TTI according to the frequency hopping information of the extended TTI, the method further includes:

determining, by the network device, a quantity of resource blocks in the frequency hopping area of the extended TTI according to the determined frequency hopping area of the extended TTI and a preset resource block size of the extended TTI; and determining, by the network device, numbers of the resource blocks in the frequency hopping area of the extended TTI according to the quantity of the resource blocks in the frequency hopping area of the extended TTI.

Based on the fourth possible implementation manner of the second aspect, in a fifth possible implementation manner, after the determining, by the network device, numbers of the resource blocks in the frequency hopping area of the extended TTI, the method includes:

receiving, by the network device, a number of a virtual resource block in which frequency hopping of the extended TTI is located; and determining, by the network device according to the number of the virtual resource block and a mapping relationship between the number of the virtual resource block and a number of a physical resource block, the number of the physical resource block in which the frequency hopping of the extended TTI is located.

Based on the fifth possible implementation manner of the second aspect, in a sixth possible implementation manner, the determining, by the network device according to the number of the virtual resource block and a mapping relationship between the number of the virtual resource block and a number of a physical resource block, the number of the physical resource block in which the frequency hopping of the extended TTI is located includes:

determining, by the network device according to the number of the virtual resource block, the quantity of the resource blocks in the frequency hopping area, and a timeslot number of the extended TTI, the number of the physical resource block in which the frequency hopping of the extended TTI is located; or determining, by the network device according to the number of the virtual resource block, the quantity of the resource blocks in the frequency hopping area, and a subframe number of the extended TTI, the number of the physical resource block in which the frequency hopping of the extended TTI is located.

Based on the fifth possible implementation manner of the second aspect, in a seventh possible implementation manner, the determining, by the network device according to the number of the virtual resource block and a mapping relationship between the number of the virtual resource block and a number of a physical resource block, the number of the physical resource block in which the frequency hopping of the extended TTI is located includes:

determining, by the network device according to the number of the virtual resource block, the quantity of the resource blocks in the frequency hopping area, and a first function $f_m(i)$, the number of the physical resource block in which the frequency hopping of the extended TTI is located, where i indicates a subframe number or a timeslot number of the extended TTI, and the first function $f_m(i)$ is a value determined according to the subframe number or a serial number of current transmission.

Based on the seventh possible implementation manner of the second aspect, in an eighth possible implementation manner, the determining, by the network device according to the number of the virtual resource block, the quantity of the resource blocks in the frequency hopping area, and a first function $f_m(i)$ the number of the physical resource block in which the frequency hopping of the extended TTI is located, where i indicates a subframe number or a timeslot number of the extended TTI includes:

determining, by the network device according to the number of the virtual resource block, the quantity of the resource blocks in the frequency hopping area, the first function $f_m(i)$ a quantity of subbands in the frequency hopping area, and a second function $f_{hop}(i)$, the number of the physical resource block in which the frequency hopping of the extended TTI is located, where i indicates a subframe number or a timeslot number of the extended TTI, and the second function $f_{hop}(i)$ is a value recursively determined according to a pseudo-random sequence.

Based on the second aspect or any one of the first to the third possible implementation manners, in a ninth possible implementation manner, after the determining, by the network device, a frequency hopping area of the extended TTI according to the frequency hopping information of the extended TTI, the method further includes:

acquiring, by the network device, a first timeslot-lowest physical resource block $n_{PRB}^{S1}(i)$ according to an indication of downlink control information; and determining, according to the first timeslot-lowest physical resource block $n_{PRB}^{S1}(i)$ that a second timeslot-lowest physical resource block is $(\lfloor N_{RB}^{sb}/2 \rfloor + n_{PRB}^{S1}(i)) \mod N_{RB}^{sb}$, where $$N_{RB}^{sb} = \begin{cases} N_{RB}^{UL} & N_{sb} = 1 \\ \lfloor (N_{RB}^{UL} - N_{RB}^{HO} - N_{RB}^{HO} \mod 2)/N_{sb} \rfloor & N_{sb} > 1 \end{cases};$$

and $N_{RB}^{HO}=0$, where $N_{RB}^{UL}$ is a quantity of resource blocks in the frequency hopping area of the extended TTI, $N_{sb}$ is a quantity of subbands in the frequency hopping area of the extended TTI, and $N_{RB}^{sb}$ is a quantity of narrowband resource blocks of one subband in the frequency hopping area of the extended TTI.

According to a third aspect, user equipment is provided, including:

a receiver, configured to receive frequency hopping information, which is sent by a network device, of an extended transmission time interval TTI; and a processor, configured to determine a frequency hopping area of the extended TTI according to the frequency hopping intonation of the extended TTI.

Based on the third aspect, in a first possible implementation manner, the frequency hopping information of the extended TTI includes a frequency hopping offset parameter of the extended TTI; and the processor is specifically configured to:

determine a frequency hopping initial location of the extended TTI according to the frequency hopping offset parameter of the extended TTI;

determine a length of the frequency hopping area of the extended TTI according to a frequency hopping offset parameter of a normal TTI and the frequency hopping offset parameter of the extended TTI; and determine the frequency hopping area of the extended TTI according to the frequency hopping initial location of the extended TTI and the length of the frequency hopping area of the extended TTI that are determined.

Based on the third aspect, in a second possible implementation manner, the frequency hopping information of the extended TTI includes a length of the frequency hopping area of the extended TTI; and the processor is specifically configured to:

determine a frequency hopping offset parameter of a normal TTI according to the frequency hopping offset parameter of the normal TTI and the length of the frequency hopping area of the extended TTI;

determine a frequency hopping initial location of the extended TTI according to a frequency hopping offset parameter of the extended TTI; and determine the frequency hopping area of the extended TTI according to the frequency hopping initial location of the extended TTI and the length of the frequency hopping area of the extended TTI that are determined.

Based on the third aspect, in a third possible implementation manner, the frequency hopping information of the extended TTI includes a frequency hopping offset parameter of the extended TTI and a length of the frequency hopping area of the extended TTI; and the processor is specifically configured to:

determine a frequency hopping initial location of the extended TTI according to the frequency hopping offset parameter of the extended TTI; and determine the frequency hopping area of the extended TTI according to the frequency hopping initial location of the extended TTI and the length of the frequency hopping area of the extended TTI that are determined.

Based on the third aspect or any one of the first to the third possible implementation manners, in a fourth possible implementation manner, the processor is further configured to:

determine a quantity of resource blocks in the frequency hopping area of the extended TTI according to the determined frequency hopping area of the extended TTI and a preset resource block size of the extended TTI; and determine numbers of the resource blocks in the frequency hopping area of the extended TTI according to the quantity of the resource blocks in the frequency hopping area of the extended TTI.

Based on the fourth possible implementation manner of the third aspect, in a fifth possible implementation manner, the receiver is further configured to receive a number of a virtual resource block in which frequency hopping of the extended TTI is located; and the processor is further configured to:

determine, according to the number of the virtual resource block and a mapping relationship between the number of the virtual resource block and a number of a physical resource block, the number of the physical resource block in which the frequency hopping of the extended TTI is located.

Based on the fifth possible implementation manner of the third aspect, in a sixth possible implementation manner, the processor is specifically further configured to:

determine, according to the number of the virtual resource block, the quantity of the resource blocks in the frequency hopping area, and a timeslot number of the extended TTI, the number of the physical resource block in which the frequency hopping of the extended TTI is located; or determine, according to the number of the virtual resource block, the quantity of the resource blocks in the frequency hopping area, and a subframe number of the extended TTI, the number of the physical resource block in which the frequency hopping of the extended TTI is located.

Based on the fifth possible implementation manner of the third aspect, in a seventh possible implementation manner, the processor is specifically further configured to:

determine, according to the number of the virtual resource block, the quantity of the resource blocks in the frequency hopping area, and a first function $f_m(i)$, the number of the physical resource block in which the frequency hopping of the extended TTI is located, where i indicates a subframe number or a timeslot number of the extended TTI, and the first function $f_m(i)$ is a value determined according to the subframe number or a serial number of current transmission.

Based on the seventh possible implementation manner of the third aspect, in an eighth possible implementation manner, the processor is specifically further configured to:

determine, according to the number of the virtual resource block, the quantity of the resource blocks in the frequency hopping area, the first function $f_m(i)$, a quantity of subbands in the frequency hopping area, and a second function $f_{hop}(i)$, the number of the physical resource block in which the frequency hopping of the extended TTI is located, where i indicates a subframe number or a timeslot number of the extended TTI, and the second function $f_{hop}(i)$ is a value recursively determined according to a pseudo-random sequence.

Based on the third aspect or anyone of the first to the third possible implementation manners, in a ninth possible implementation manner, the processor is further configured to:

acquire a first timeslot-lowest physical resource block $n_{PRB}^{S1}(i)$ according to an indication of downlink control information; and determine, according to the first timeslot-lowest physical resource block $n_{PRB}^{S1}(i)$ that a second timeslot-lowest physical resource block is $(\lfloor N_{RB}^{sb}/2 \rfloor + n_{PRB}^{S1}(i)) \bmod N_{RB}^{sb}$, where $$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases};$$

and $N_{RB}^{HO}=0$, where $N_{RB}^{UL}$ is a quantity of resource blocks in the frequency hopping area of the extended TTI, $N_{sb}$ is a quantity of subbands in the frequency hopping area of the extended TTI, and $N_{RB}^{sb}$ is a quantity of narrowband resource blocks of one subband in the frequency hopping area of the extended TTI.

According to a fourth aspect, a network device is provided, including:

a processor, configured to determine frequency hopping information of an extended transmission time interval TTI of user equipment, where the extended TTI is a TTI whose time length is greater than 1 millisecond; and a transmitter, configured to send the frequency hopping information of the extended TTI to the user equipment, where the processor is further configured to determine a frequency hopping area of the extended TTI of the user equipment according to the frequency hopping information of the extended TTI.

Based on the fourth aspect, in a first possible implementation manner, the frequency hopping information of the extended TTI includes a frequency hopping offset parameter of the extended TTI; and the processor is specifically configured to:

determine a frequency hopping initial location of the extended TTI according to the frequency hopping offset parameter of the extended TTI;

determine a length of the frequency hopping area of the extended TTI according to a frequency hopping offset parameter of a normal TTI and the frequency hopping offset parameter of the extended TTI, where the normal TTI is a TTI whose time length is equal to 1 millisecond; and determine the frequency hopping area of the extended TTI according to the frequency hopping initial location of the extended TTI and the length of the frequency hopping area of the extended TTI that are determined.

Based on the fourth aspect, in a second possible implementation manner, the frequency hopping information of the extended TTI includes a length of the frequency hopping area of the extended TTI; and the processor is specifically configured to:

determine a frequency hopping offset parameter of a normal TTI according to the frequency hopping offset parameter of the normal TTI and the length of the frequency hopping area of the extended TTI, where the normal TTI is a TTI whose time length is equal to 1 millisecond;

determine a frequency hopping initial location of the extended TTI according to a frequency hopping offset parameter of the extended TTI; and determine the frequency hopping area of the extended TTI according to the frequency hopping initial location of the extended TTI and the length of the frequency hopping area of the extended TTI that are determined.

Based on the fourth aspect, in a third possible implementation manner, the frequency hopping information of the extended TTI includes a frequency hopping offset parameter of the extended TTI and a length of the frequency hopping area of the extended TTI; and the processor is specifically configured to:

determine a frequency hopping initial location of the extended TTI according to the frequency hopping offset parameter of the extended TTI; and determine the frequency hopping area of the extended TTI according to the frequency hopping initial location of the extended TTI and the length of the frequency hopping area of the extended TTI that are determined.

Based on the fourth aspect or any one of the first to the third possible implementation manners, in a fourth possible implementation manner, the processor is further configured to:

determine a quantity of resource blocks in the frequency hopping area of the extended TTI according to the determined frequency hopping area of the extended TTI and a preset resource block size of the extended TTI; and determine numbers of the resource blocks in the frequency hopping area of the extended TTI according to the quantity of the resource blocks in the frequency hopping area of the extended TTI.

Based on the fourth possible implementation manner of the fourth aspect, in a fifth possible implementation manner, the processor is further configured to determine, according to a number of a virtual resource block in which frequency hopping of the extended TTI is located and a mapping relationship between the number of the virtual resource block and a number of a physical resource block, the number of the physical resource block in which the frequency hopping of the extended TTI is located.

Based on the fifth possible implementation manner of the fourth aspect, in a sixth possible implementation manner, the processor is further configured to:

determine, according to the number of the virtual resource block, the quantity of the resource blocks in the frequency hopping area, and a timeslot number of the extended TTI, the number of the physical resource block in which the frequency hopping of the extended TTI is located; or determine, according to the number of the virtual resource block, the quantity of the resource blocks in the frequency hopping area, and a subframe number of the extended TTI, the number of the physical resource block in which the frequency hopping of the extended TTI is located.

Based on the fifth possible implementation manner of the fourth aspect, in a seventh possible implementation manner, the processor is further configured to:

determine, according to the number of the virtual resource block, the quantity of the resource blocks in the frequency hopping area, and a first function $f_m(i)$, the number of the physical resource block in which the frequency hopping of the extended TTI is located, where i indicates a subframe number or a timeslot number of the extended TTI, and the first function $f_m(i)$ is a value determined according to the subframe number or a serial number of current transmission.

Based on the seventh possible implementation manner of the fourth aspect, in an eighth possible implementation manner, the processor is further configured to:

determine, according to the number of the virtual resource block, the quantity of the resource blocks in the frequency hopping area, the first function $f_m(i)$ a quantity of subbands in the frequency hopping area, and a second function $f_{hop}(i)$, the number of the physical resource block in which the frequency hopping of the extended TTI is located, where i indicates a subframe number or a timeslot number of the extended TTI, and the second function $f_{hop}(i)$ is a value recursively determined according to a pseudo-random sequence.

Based on the fourth aspect or any one of the first to the third possible implementation manners, in a ninth possible implementation manner, the processor is further configured to acquire a first timeslot-lowest physical resource block $n_{PRB}^{S1}(i)$ according to an indication of downlink control information; and determine, according to the first timeslot-lowest physical resource block $n_{PRB}^{S1}(i)$, that a second timeslot-lowest physical resource block is $(\lfloor N_{RB}^{sb}/2 \rfloor + n_{PRB}^{S1}(i)) \bmod N_{RB}^{sb}$, where $$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases};$$

and $N_{RB}^{HO}=0$, where $N_{RB}^{UL}$ is a quantity of resource blocks in the frequency hopping area of the extended TTI, $N_{sb}$ is a quantity of subbands in the frequency hopping area of the extended TTI, and $N_{RB}^{sb}$ is a quantity of narrowband resource blocks of one subband in the frequency hopping area of the extended TTI.

In embodiments of the present invention, user equipment receives frequency hopping information, which is sent by a network device, of an extended transmission time interval TTI; and determines a frequency hopping area of the extended TTI according to the frequency hopping information of the extended TTI, where the frequency hopping area of the extended TTI and a frequency hopping area of a normal TTI do not overlap in frequency; and then during M-PUSCH frequency hopping of each extended TTI, the user equipment can hop into a corresponding M-PUSCH frequency hopping area according to a preset frequency hopping pattern, and does not hop into a PUSCH frequency hopping area, so that a resource conflict does not exist when M-PUSCH frequency hopping of an extended TTI and PUSCH frequency hopping of a 1 ms TTI are performed at the same time.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention can be applied to various wireless communications systems, for example, a Global System for Mobile Communications (GSM), a General Packet Radio Service (GPRS) system, a Code Division Multiple Access (CDMA) system, a CDMA2000 system, a Wideband Code Division Multiple Access (WCDMA) system, a Long Term Evolution (LTE) system, and a World Interoperability for Microwave Access (WiMAX) system.

It should be noted that, in the embodiments, an extended TTI refers to a TTI whose time length is greater than 1 ms, and a normal TTI refers to a TTI whose time length is 1 ms.

Figure 1:
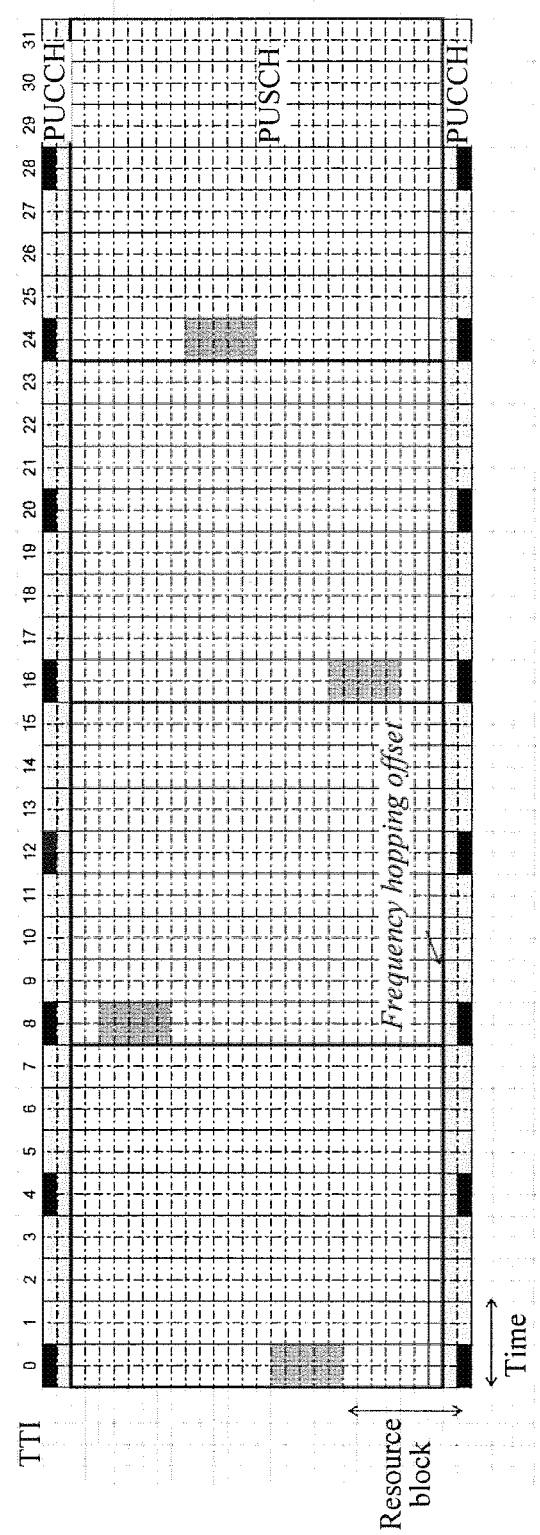
FIG. 1 is a schematic diagram of frequency hopping of a PUCCH and a PUSCH in the prior art.
Figure 2:
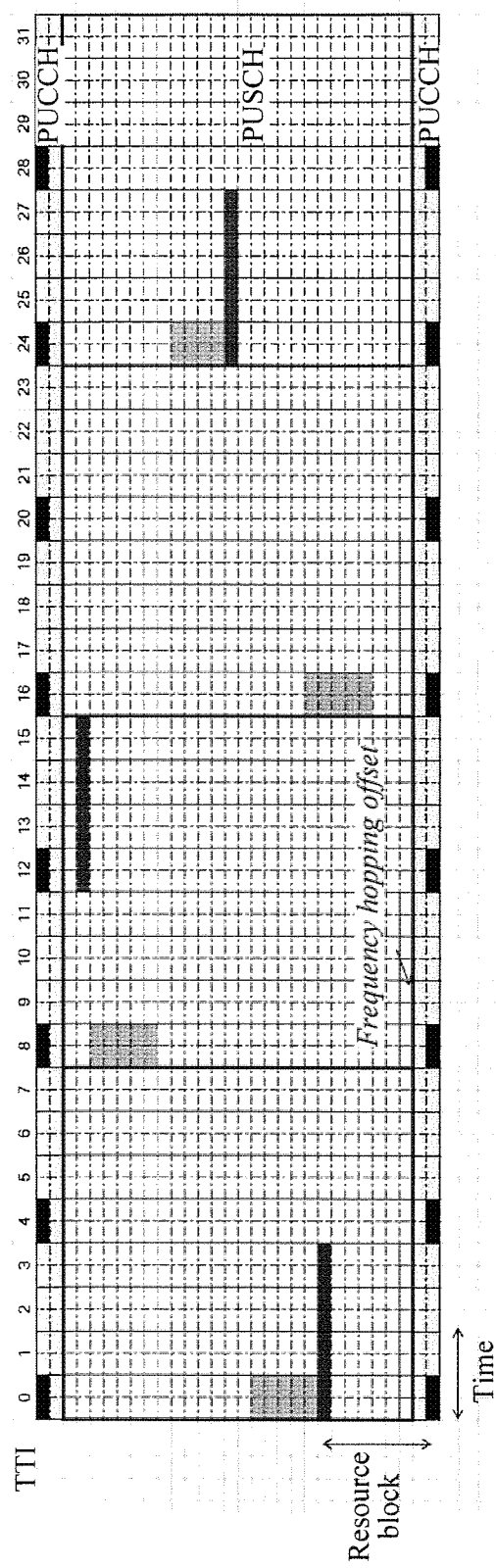
FIG. 2 is a schematic diagram of a resource conflict when M-PUSCH frequency hopping of an extended TTI and PUSCH frequency hopping of a 1 ms TTI are performed at the same time.
Figure 3:
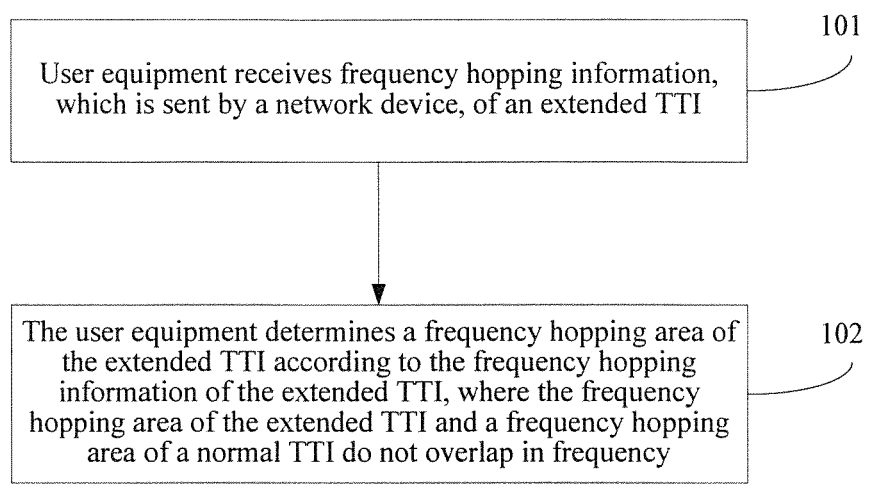
FIG. 3 is a schematic flowchart of a frequency hopping processing method according to an embodiment of the present invention.

FIG. 3 is a schematic flowchart of a frequency hopping processing method according to an embodiment of the present invention. As shown in FIG. 3, the frequency hopping processing method in this embodiment may include:

101: User equipment receives frequency hopping information, which is sent by a network device, of an extended TTI.

To resolve a problem that a resource conflict may exist when M-PUSCH frequency hopping of an extended TTI and PUSCH frequency hopping of a 1 ms TTI are performed at the same time, in this embodiment, the network device determines, according to a distribution feature of the M-PUSCH frequency hopping of the extended TTI, an initial location, in a frequency resource, of the M-PUSCH frequency hopping of the extended TTI, and a length of an M-PUSCH frequency hopping area of the extended TTI, so that the M-PUSCH frequency hopping area of the extended TTI and a PUSCH frequency hopping area of a normal TTI do not overlap in the frequency resource, and it may be implemented that during the M-PUSCH frequency hopping of the extended TTI, in the corresponding M-PUSCH frequency hopping area, hopping into the PUSCH frequency hopping area does not occur. In this way, the resource conflict does not exist.

Figure 4:
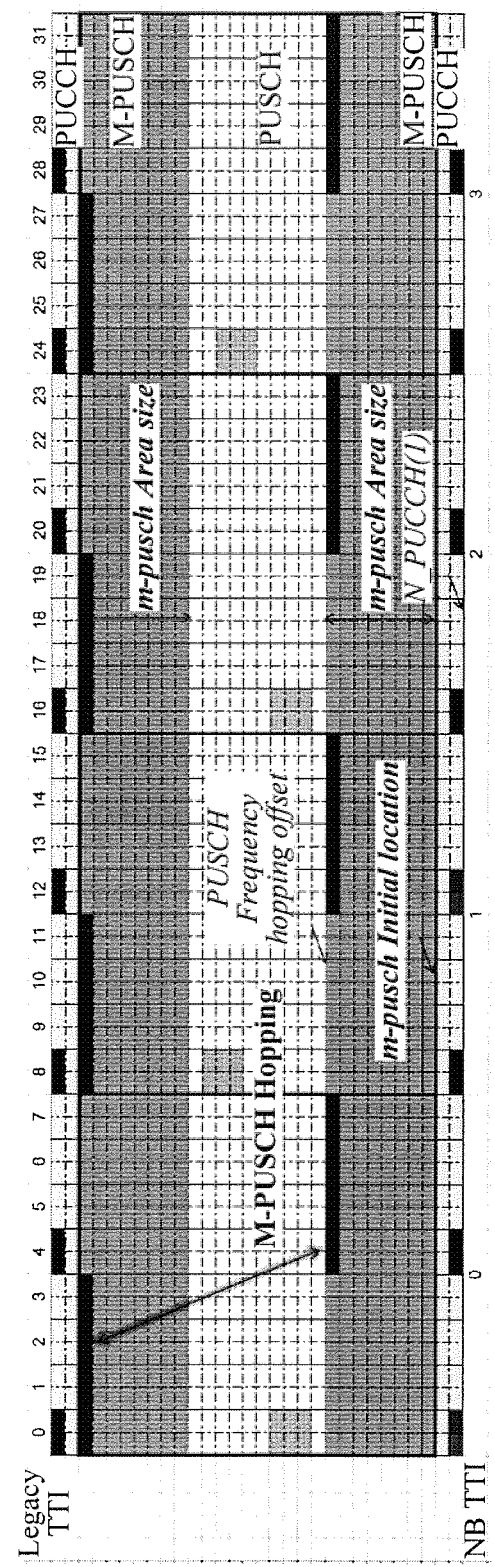
FIG. 4 is a schematic diagram of M-PUSCH frequency hopping of an extended TTI and PUSCH frequency hopping of a 1 ms TTI according to this embodiment.

FIG. 4 is a schematic diagram of M-PUSCH frequency hopping of an extended TTI and PUSCH frequency hopping of a 1 ms TTI according to this embodiment. As shown in FIG. 4, the extended TTI being 4 ms is used as an example, and this embodiment of the present invention includes various extended TTIs greater than 1 ms, such as 2 ms, 4 ms, 8 ms, 10 ms, and 12 ms. The network device may set an initial location of the M-PUSCH frequency hopping of the extended TTI to be at a boundary between an M-PUSCH frequency hopping area and a PUCCH. Further, the network device may set a length of the M-PUSCH frequency hopping area, and therefore can determine a location, in a frequency resource, of the M-PUSCH frequency hopping area. Alternatively, the network device may set an initial location of PUSCH frequency hopping of a normal TTI to be at a boundary between the M-PUSCH frequency hopping area and an PUSCH frequency hopping area, so that the length of the M-PUSCH frequency hopping area may be determined according to a difference between the initial location of the PUSCH frequency hopping and the initial location of the M-PUSCH frequency hopping, and then the location, in the frequency resource, of the M-PUSCH frequency hopping area may be determined.

Further, after the network device sets the location, in the frequency resource, of the M-PUSCH frequency hopping area of the extended TTI, the network device sends the frequency hopping information of the extended TTI to the user equipment. For example, the frequency hopping information of the extended TTI includes a frequency hopping offset parameter of the extended TTI and/or a length of a frequency hopping area of the extended TTI.

102: The user equipment determines a frequency hopping area of the extended TTI according to the frequency hopping information of the extended TTI, where the frequency hopping area of the extended TTI and a frequency hopping area of a normal TTI do not overlap in frequency.

In a possible implementation manner of this embodiment, if the frequency hopping information of the extended TTI includes a frequency hopping offset parameter (m-pusch-Offset) of the extended TTI, and it is assumed that the user equipment also receives a frequency hopping offset parameter (pusch-Hopping Offset), which is sent by the network device, of the normal TTI, and the frequency hopping offset parameter of the extended TTI is different from the frequency hopping offset parameter, which is received by the user equipment, of the normal TTI, that is, an initial location corresponding to the frequency hopping offset parameter of the extended TTI is different, in a frequency resource, from an initial location corresponding to the frequency hopping offset parameter of the normal TTI, step 102 includes:

determining, by the user equipment, a frequency hopping initial location of the extended TTI according to the frequency hopping offset parameter of the extended TTI;

determining a length of the frequency hopping area of the extended TTI according to a difference between the frequency hopping offset parameter of the normal TTI and the frequency hopping offset parameter of the extended TTI; and determining the frequency hopping area of the extended TTI according to the frequency hopping initial location of the extended TTI and the length of the frequency hopping area of the extended TTI that are determined.

In a possible implementation manner of this embodiment, if the frequency hopping information of the extended TTI includes a length (m-pusch-Length) of the frequency hopping area of the extended TTI, and it is assumed that the user equipment also receives the frequency hopping offset parameter, which is sent by the network device, of the normal TTI, step 102 includes:

determining, by the user equipment, the frequency hopping offset parameter of the normal TTI according to a difference between the frequency hopping offset parameter of the normal TTI and the length of the frequency hopping area of the extended TTI;

determining a frequency hopping initial location of the extended TTI according to a frequency hopping offset parameter of the extended TTI; and determining the frequency hopping area of the extended TTI according to the frequency hopping initial location of the extended TTI and the length of the frequency hopping area of the extended TTI that are determined.

In a possible implementation manner of this embodiment, if the frequency hopping information of the extended TTI includes a frequency hopping offset parameter of the extended TTI and a length of the frequency hopping area of the extended TTI, step 102 includes:

determining, by the user equipment, a frequency hopping initial location of the extended TTI according to the frequency hopping offset parameter of the extended TTI; and determining the frequency hopping area of the extended TTI according to the frequency hopping initial location of the extended TTI and the length of the frequency hopping area of the extended TTI that are determined.

Subsequently, an M-PUSCH, which is used by the user equipment, of the extended TTI may perform frequency hopping in a corresponding M-PUSCH frequency hopping area, and does not hop into the PUSCH frequency hopping area; and in this way, a problem of resource conflict does not exist between the PUSCH frequency hopping area and the M-PUSCH frequency hopping area.

In a possible implementation manner of this embodiment, the network device may set two or more M-PUSCH frequency hopping areas of the extended TTI. It is assumed that the network device sets two M-PUSCH frequency hopping areas of the extended TTI, and then the frequency hopping information, which is sent by the network device, of the extended TTI includes at least two m-pusch-Offset parameters and/or at least two m-pusch-Length parameters.

Figure 5:
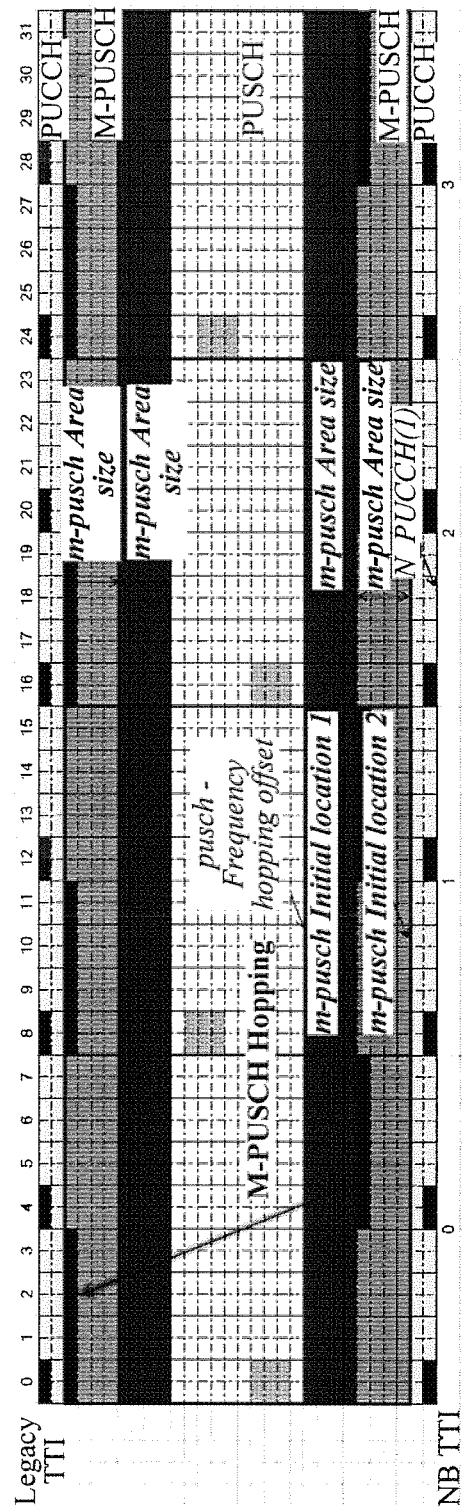
FIG. 5 is another schematic diagram of M-PUSCH frequency hopping of an extended TTI and PUSCH frequency hopping of a 1 ms TTI according to this embodiment.

FIG. 5 is another schematic diagram of M-PUSCH frequency hopping of an extended TTI and PUSCH frequency hopping of a 1 ms TTI according to this embodiment. As shown in FIG. 5, a frequency hopping offset parameter corresponding to an M-PUSCH frequency hopping area 1 is m-pusch-Offset-1, and/or a length of the M-PUSCH frequency hopping area 1 is m-pusch-Length-1; a frequency hopping offset parameter corresponding to a M-PUSCH frequency hopping area 2 is m-pusch-Offset-2, and/or a length of the M-PUSCH frequency hopping area 2 is m-pusch-Length-2.

An M-PUSCH 1 performs frequency hopping in the corresponding M-PUSCH frequency hopping area 1, and an M-PUSCH 2 performs frequency hopping in the corresponding M-PUSCH frequency hopping area 2. No resource conflict exists between the M-PUSCH frequency hopping area 1 and the M-PUSCH frequency hopping area 2, and a PUSCH frequency hopping area, and no resource conflict exists between different M-PUSCH frequency hopping areas.

In a possible implementation manner of this embodiment, after step 102, the method further includes:

determining, by the user equipment, a quantity of resource blocks in the frequency hopping area of the extended TTI according to the determined frequency hopping area of the extended TTI and a preset resource block size of the extended TTI.

During a specific implementation, a resource block size (for example, a size of a preset frequency resource of a narrowband resource block) of one extended TTI is determined first; it is assumed that 12 subcarriers of 1.25 kHz are used as a frequency resource of one narrowband resource block, and then the resource block size of the one extended TTI is 15 kHz, or it is assumed that one GMSK signal of 2 kHz is used as the resource block size of the extended TTI. Resource blocks are numbered in ascending order or descending order of frequencies according to bandwidth of one resource block of a narrowband signal. If a resource block in a case of m-pusch-Length of an M-PUSCH frequency hopping area being two 1-ms TTIs is configured, a size (total frequency resource) of the M-PUSCH frequency hopping area is 2*180*2=720 kHz. If a resource block size of an extended TTI is 15 kHz, a quantity of resource blocks in an M-PUSCH frequency hopping area is 48, that is, 720 kHz/15 kHz=48; or if a resource block size of an extended TTI is 2 kHz, a quantity of resource blocks in an M-PUSCH frequency hopping area is 360, that is, 720 kHz/2 kHz=360.

Subsequently, the user equipment determines numbers of the resource blocks in the frequency hopping area of the extended TTI according to the quantity of the resource blocks in the frequency hopping area of the extended TTI.

The determined quantity of the resource blocks is used as an example, and if the quantity of the resource blocks in the M-PUSCH frequency hopping area is 48, numbers of the resource blocks are respectively 0 to 47; if the quantity of the resource blocks in the M-PUSCH frequency hopping area is 360, numbers of the resource blocks are respectively 0 to 359.

In a possible implementation manner of this embodiment, to enable M-PUSCH frequency hopping of an extended TTI to reach a maximum frequency diversity gain as far as possible, as shown in FIG. 4, in this embodiment, a frequency hopping pattern that is set by means of pre-negotiation between the user equipment and the network device: during M-PUSCH frequency hopping of each extended TTI, frequency hopping to resource frequencies on two sides of an M-PUSCH frequency hopping area is performed as far as possible.

In a possible implementation manner of this embodiment, it is assumed that a resource block number, which is preset in a frequency hopping pattern, of M-PUSCH frequency hopping of each extended TTI is a virtual resource block number; in this embodiment, the user equipment receives a number of a virtual resource block in which frequency hopping of the extended TTI is located; and determines, according to the number of the virtual resource block and a mapping relationship between the number of the virtual resource block and a number of a physical resource block, the number of the physical resource block in which the frequency hopping of the extended TTI is located; and during a specific implementation, the method includes:

determining, according to the number of the virtual resource block, the quantity of the resource blocks in the frequency hopping area, and a timeslot number of the extended TTI, the number of the physical resource block in which the frequency hopping of the extended TTI is located; or determining, according to the number of the virtual resource block, the quantity of the resource blocks in the frequency hopping area, and a subframe number of the extended TTI, the number of the physical resource block in which the frequency hopping of the extended TTI is located; or determining, according to the number of the virtual resource block, the quantity of the resource blocks in the frequency hopping area, and a first function $f_m(i)$, the number of the physical resource block in which the frequency hopping of the extended TTI is located, where i indicates a subframe number or a timeslot number of the extended TTI, and the first function $f_m(i)$ is a value determined according to the subframe number or a serial number of current transmission.

During a specific implementation, the determining, according to the number of the virtual resource block, the quantity of the resource blocks in the frequency hopping area, and a first function $f_m(i)$, the number of the physical resource block in which the frequency hopping of the extended TTI is located, where i indicates a subframe number or a timeslot number of the extended TTI includes:

determining, according to the number of the virtual resource block, the quantity of the resource blocks in the frequency hopping area, the first function $f_m(i)$ a quantity of subbands in the frequency hopping area, and a second function $f_{hop}(i)$, the number of the physical resource block in which the frequency hopping of the extended TTI is located, where i indicates a subframe number or a timeslot number of the extended TTI, and the second function $f_{hop}(i)$ is a value recursively determined according to a pseudo-random sequence.

In an optional implementation manner of the present invention, after the determining a frequency hopping area of the extended TTI according to the frequency hopping information of the extended TTI, the method includes:

acquiring a first timeslot-lowest physical resource block $n_{PRB}^{S1}(i)$ according to an indication of downlink control information; and determining, according to the first timeslot-lowest physical resource block $n_{PRB}^{S1}(i)$ that a second timeslot-lowest physical resource block is $(\lfloor N_{RB}^{sb}/2 \rfloor + n_{PRB}^{S1}(i)) \bmod N_{RB}^{sb}$, where $$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases};$$

and $N_{RB}^{HO}=0$, where $N_{RB}^{UL}$ is a quantity of resource blocks in the frequency hopping area of the extended TTI, $N_{sb}$ is a quantity of subbands in the frequency hopping area of the extended TTI, and $N_{RB}^{sb}$ is a quantity of narrowband resource blocks of one subband in the frequency hopping area of the extended TTI.

The following describes an implementation process of the foregoing solution by using examples:

For example, a mapping relationship 1 between a number of a virtual resource block and a number of a physical resource block is an inter-subframe mapping formula:

$$n_{PRB}(n_s) = n_{VRB} + ((N_{RB}^{nb} - 1) - 2n_{VRB}) \cdot f_m(i)$$
$$i = n_s,$$

where $f_m(i)$=CURRENT_TX_NB mod 2, where CURRENT_TX_NB is a serial number of transmission of a transmission block in an $n_s^{th}$ extended TTI, that is, which time the transmission is performed; and $n_{VRB}$ is a virtual resource block number of M-PUSCH frequency hopping of the $n_s^{th}$ extended TTI, and $N_{RB}^{nb}$ is a quantity of resource blocks in an M-PUSCH frequency hopping area of the extended TTI.

For another example, a mapping relationship 2 between a number of a virtual resource block and a number of a physical resource block is an inter-subframe and intra-subframe mapping formula:

$$n_{PRB}(n_s) = n_{VRB} + ((N_{RB}^{nb} - 1) - 2n_{VRB}) \cdot f_m(i)$$
$$i = \lfloor n_s/2 \rfloor,$$

where $f_m(i)=i \bmod 2$.

For another example, it is assumed that one M-PUSCH frequency hopping area is divided into multiple subbands, and a frequency hopping pattern is determined according to a subband size $N_{RB}^{nb\_sb}$ and a subband quantity $N_{nb\_sb}$; and then a mapping relationship 3 between a number of a virtual resource block and a number of a physical resource block is:

$$n_{PRB}(n_s) = \\ (n_{VRB} + f_{hop}(i) \cdot N_{RB}^{nb\_sb} + ((N_{RB}^{nb\_sb} - 1) - 2(n_{VRB} \bmod N_{RB}^{nb\_sb})) \cdot f_m(i)) \\ \bmod(N_{RB}^{nb\_sb} \cdot N_{nb\_sb})$$

$$i = \begin{cases} \lfloor n_s/2 \rfloor & \text{inter-}subframe \text{ hopping} \\ n_s & \text{intra and inter-}subframe \text{ hopping} \end{cases}$$

$$N_{RB}^{nb\_sb} = \begin{cases} N_{RB}^{nb} & N_{nb\_sb} = 1 \\ \lfloor N_{RB}^{nb}/N_{nb\_sb} \rfloor & N_{nb\_sb} > 1 \end{cases}$$

where $$f_{hop}(i) = \begin{cases} 0 & N_{nb\_sb} = 1 \\ \left(f_{hop}(i-1) + \sum_{k=i \cdot 10+1}^{i \cdot 10+9} c(k) \times 2^{k-(i \cdot 10+1)}\right) \bmod N_{nb\_sb} & N_{nb\_sb} = 2 \\ \left(f_{hop}(i-1) + \left(\sum_{k=i \cdot 10+1}^{i \cdot 10+9} c(k) \times 2^{k-(i \cdot 10+1)}\right) \bmod (N_{nb\_sb} - 1) + 1\right) \bmod N_{nb\_sb} & N_{nb\_sb} > 2 \end{cases}$$

$$f_m(i) = \begin{cases} i \bmod 2 & N_{sb} = 1 \text{ and intra and inter-}subframe \text{ hopping} \\ \text{CURRENT\_TX\_NB} \bmod 2 & N_{sb} = 1 \text{ and inter-}subframe \text{ hopping} \\ c(i \cdot 10) & N_{sb} > 1 \end{cases}$$

and $c(m)$ is a random sequence; details are not described herein again, and reference may be made to TS36.211.

For another example, a mapping relationship 4 between a number of a virtual resource block and a number of a physical resource block is:

$$\tilde{n}_{PRB}(n_s) = (\tilde{n}_{VRB} + f_{hop}(i) \cdot N_{RB}^{sb} + ((N_{RB}^{sb} - 1) - 2(\tilde{n}_{VRB} \bmod N_{RB}^{sb})) \cdot f_m(i)) \\ \bmod(N_{RB}^{sb} \cdot N_{sb})$$

$$i = \begin{cases} \lfloor n_s/2 \rfloor & \text{inter-}subframe \text{ hopping} \\ n_s & \text{intra and inter-}subframe \text{ hopping} \end{cases}$$

$$n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases}$$

$$\tilde{n}_{VRB} = \begin{cases} n_{VRB} & N_{sb} = 1 \\ n_{VRB} - \lceil N_{RB}^{HO}/2 \rceil & N_{sb} > 1 \end{cases}$$

$$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases}$$

$$f_{hop}(i) = \begin{cases} 0 & N_{sb} = 1 \\ \left(f_{hop}(i-1) + \sum_{k=i \cdot 10+1}^{i \cdot 10+9} c(k) \times 2^{k-(i \cdot 10+1)}\right) \bmod N_{sb} & N_{sb} = 2 \\ \left(f_{hop}(i-1) + \left(\sum_{k=i \cdot 10+1}^{i \cdot 10+9} c(k) \times 2^{k-(i \cdot 10+1)}\right) \bmod (N_{sb} - 1) + 1\right) \bmod N_{sb} & N_{sb} > 2 \end{cases}$$

-continued $$f_m(i) = \begin{cases} i \bmod 2 & N_{sb} = 1 \text{ and intra and inter-subframe hopping} \\ \text{CURRENT\_TX\_NB} \bmod 2 & N_{sb} = 1 \text{ and inter-subframe hopping} \\ c(i \cdot 10) & N_{sb} > 1 \end{cases}$$

where $N_{RB}{}^{HO}=0$, $N_{RB}{}^{UL}$ is a quantity of resource blocks in an M-PUSCH frequency hopping area, $N_{sb}$ is a quantity of subbands in the M-PUSCH frequency hopping area, and $n_{RB}{}^{sb}$ is a quantity of narrowband resource blocks of one subband in the M-PUSCH frequency hopping area; for other parameters, refer to descriptions in mapping relationships (1), (2), and (3), and details are not described again.

For another example, a mapping relationship 5 between a number of a virtual resource block and a number of a physical resource block is:

$$n_{PRB} = \begin{cases} \left\lfloor \frac{m}{2} \right\rfloor & \text{if}(m + n_s \bmod 2) \bmod 2 = 0 \\ N_{RB}^{mb} - 1 - \left\lfloor \frac{m}{2} \right\rfloor & \text{if}(m + n_s \bmod 2) \bmod 2 = 1 \end{cases}$$

where m is information about an allocated resource, and may be understood as the virtual resource block.

For another example, a mapping relationship 6 between a number of a virtual resource block and a number of a physical resource block is:

a lowest physical resource block of a first extended TTI is $n_{PRB}{}^{S1}$, a lowest physical resource block of a second extended TTI is $(\lfloor N_{RB}{}^{sb}/2 \rfloor + n_{PRB}{}^{S1}(i)) \bmod N_{RB}{}^{sb}$, and the lowest physical resource block $n_{PRB}{}^{S1}(i)$ of the first extended TTI is indicated by downlink control information.

In this embodiment of the present invention, user equipment receives frequency hopping information, which is sent by a network device, of an extended transmission time interval TTI; and determines a frequency hopping area of the extended TTI according to the frequency hopping information of the extended TTI, where the frequency hopping area of the extended TTI and a frequency hopping area of a normal TTI do not overlap in frequency; and then during M-PUSCH frequency hopping of each extended TTI, the user equipment can hop into a corresponding M-PUSCH frequency hopping area according to a preset frequency hopping pattern, and does not hop into a PUSCH frequency hopping area, so that a resource conflict does not exist when M-PUSCH frequency hopping of an extended TTI and PUSCH frequency hopping of a 1 ms TTI are performed at the same time.

It should be noted that, same as a general communications system, a frequency hopping system requires carrier synchronization, bit synchronization, and frame synchronization to be implemented. In addition, a carrier frequency of the frequency hopping system changes according to a pseudo-random sequence, and to implement normal communication between a network device and user equipment, the network device and the user equipment must hop, at a same time, to a same frequency; therefore the frequency hopping system further requires frequency hopping pattern synchronization to be implemented.

Therefore, in this embodiment of the present invention, after a network device determines frequency hopping information of an extended transmission time interval TTI of user equipment, and sends the frequency hopping information of the extended TTI to the user equipment, the network device determines a frequency hopping area of the extended TTI of the user equipment according to the frequency hopping information of the extended TTI.

For example, the frequency hopping information of the extended TTI includes a frequency hopping offset parameter of the extended TTI; and the determining, by the network device, a frequency hopping area of the extended TTI of the user equipment according to the frequency hopping information of the extended TTI includes:

determining, by the network device, a frequency hopping initial location of the extended TTI according to the frequency hopping offset parameter of the extended TTI;

determining a length of the frequency hopping area of the extended TTI according to a frequency hopping offset parameter of a normal TTI and the frequency hopping offset parameter of the extended TTI, where the normal TTI is a TTI whose time length is equal to 1 millisecond; and determining the frequency hopping area of the extended TTI according to the frequency hopping initial location of the extended TTI and the length of the frequency hopping area of the extended TTI that are determined.

For example, the frequency hopping information of the extended TTI includes a length of a frequency hopping area of the extended TTI; and the determining, by the network device, a frequency hopping area of the extended TTI of the user equipment according to the frequency hopping information of the extended TTI includes:

determining, by the network device, a frequency hopping offset parameter of a normal TTI according to the frequency hopping offset parameter of the normal TTI and the length of the frequency hopping area of the extended TTI, where the normal TTI is a TTI whose time length is equal to 1 millisecond;

determining a frequency hopping initial location of the extended TTI according to a frequency hopping offset parameter of the extended TTI; and determining the frequency hopping area of the extended TTI according to the frequency hopping initial location of the extended TTI and the length of the frequency hopping area of the extended TTI that are determined.

For example, the frequency hopping information of the extended TTI includes a frequency hopping offset parameter of the extended TTI and a length of a frequency hopping area of the extended TTI; and the determining, by the network device, a frequency hopping area of the extended TTI of the user equipment according to the frequency hopping information of the extended TTI includes:

determining, by the network device, a frequency hopping initial location of the extended TTI according to the frequency hopping offset parameter of the extended TTI; and determining the frequency hopping area of the extended TTI according to the frequency hopping initial location of the extended TTI and the length of the frequency hopping area of the extended TTI that are determined.

For example, after the determining, by the network device, a frequency hopping area of the extended TTI according to the frequency hopping information of the extended TTI, the method further includes:

determining, by the network device, a quantity of resource blocks in the frequency hopping area of the extended TTI according to the determined frequency hopping area of the extended TTI and a preset resource block size of the extended TTI; and determining, by the network device, numbers of the resource blocks in the frequency hopping area of the extended TTI according to the quantity of the resource blocks in the frequency hopping area of the extended TTI.

For example, after the determining, by the network device, numbers of the resource blocks in the frequency hopping area of the extended TTI, the method includes:

receiving, by the network device, a number of a virtual resource block in which frequency hopping of the extended TTI is located; and determining, by the network device according to the number of the virtual resource block and a mapping relationship between the number of the virtual resource block and a number of a physical resource block, the number of the physical resource block in which the frequency hopping of the extended TTI is located.

For example, the determining, by the network device according to the number of the virtual resource block and a mapping relationship between the number of the virtual resource block and a number of a physical resource block, the number of the physical resource block in which the frequency hopping of the extended TTI is located includes:

determining, by the network device according to the number of the virtual resource block, the quantity of the resource blocks in the frequency hopping area, and a timeslot number of the extended TTI, the number of the physical resource block in which the frequency hopping of the extended TTI is located; or determining, by the network device according to the number of the virtual resource block, the quantity of the resource blocks in the frequency hopping area, and a subframe number of the extended TTI, the number of the physical resource block in which the frequency hopping of the extended TTI is located.

For example, the determining, by the network device according to the number of the virtual resource block and a mapping relationship between the number of the virtual resource block and a number of a physical resource block, the number of the physical resource block in which the frequency hopping of the extended TTI is located includes:

determining, by the network device according to the number of the virtual resource block, the quantity of the resource blocks in the frequency hopping area, and a first function $f_m(i)$, the number of the physical resource block in which the frequency hopping of the extended TTI is located, where i indicates a subframe number or a timeslot number of the extended TTI, and the first function $f_m(i)$ is a value determined according to the subframe number or a serial number of current transmission.

For example, the determining, by the network device according to the number of the virtual resource block, the quantity of the resource blocks in the frequency hopping area, and a first function $f_m(i)$, the number of the physical resource block in which the frequency hopping of the extended TTI is located, where i indicates a subframe number or a timeslot number of the extended TTI includes:

determining, by the network device according to the number of the virtual resource block, the quantity of the resource blocks in the frequency hopping area, the first function $f_m(i)$ a quantity of subbands in the frequency hopping area, and a second function $f_{hop}(i)$, the number of the physical resource block in which the frequency hopping of the extended TTI is located, where i indicates a subframe number or a timeslot number of the extended TTI, and the second function $f_{hop}(i)$ is a value recursively determined according to a pseudo-random sequence.

For example, after the determining, by the network device, a frequency hopping area of the extended TTI according to the frequency hopping information of the extended TTI, the method further includes:

acquiring, by the network device, a first timeslot-lowest physical resource block $n_{PRB}^{S1}(i)$ according to an indication of downlink control information; and determining, according to the first timeslot-lowest physical resource block $n_{PRB}^{S1}(i)$, that a second timeslot-lowest physical resource block is $(\lfloor N_{RB}^{sb}/2 \rfloor + n_{PRB}^{S1}(i)) \bmod N_{RB}^{sb}$, where $$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases};$$

and $N_{RB}^{HO}=0$, where $N_{RB}^{UL}$ is a quantity of resource blocks in the frequency hopping area of the extended TTI, $N_{sb}$ is a quantity of subbands in the frequency hopping area of the extended TTI, and $N_{RB}^{sb}$ is a quantity of narrowband resource blocks of one subband in the frequency hopping area of the extended TTI.

Figure 6:
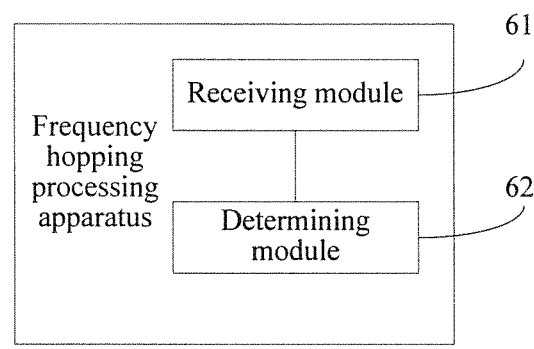
FIG. 6 is a schematic structural diagram of a frequency hopping processing apparatus according to an embodiment of the present invention.

FIG. 6 is a schematic structural diagram of a frequency hopping processing apparatus according to an embodiment of the present invention. As shown in FIG. 6, the apparatus includes:

a receiving module 61, configured to receive frequency hopping information, which is sent by a network device, of an extended transmission time interval TTI; and a determining module 62, configured to determine a frequency hopping area of the extended TTI according to the frequency hopping information of the extended TTI.

For example, the frequency hopping information of the extended TTI includes a frequency hopping offset parameter of the extended TTI; and the determining module 62 is specifically configured to:

determine a frequency hopping initial location of the extended TTI according to the frequency hopping offset parameter of the extended TTI;

determine a length of the frequency hopping area of the extended TTI according to a frequency hopping offset parameter of a normal TTI and the frequency hopping offset parameter of the extended TTI; and determine the frequency hopping area of the extended TTI according to the frequency hopping initial location of the extended TTI and the length of the frequency hopping area of the extended TTI that are determined.

For example, the frequency hopping information of the extended TTI includes a length of a frequency hopping area of the extended TTI; and the determining module 62 is specifically configured to:

determine a frequency hopping offset parameter of a normal TTI according to the frequency hopping offset parameter of the normal TTI and the length of the frequency hopping area of the extended TTI;

determine a frequency hopping initial location of the extended TTI according to a frequency hopping offset parameter of the extended TTI; and determine the frequency hopping area of the extended TTI according to the frequency hopping initial location of the extended TTI and the length of the frequency hopping area of the extended TTI that are determined.

For example, the frequency hopping information of the extended TTI includes a frequency hopping offset parameter of the extended TTI and a length of a frequency hopping area of the extended TTI; and the determining module 62 is specifically configured to:

determine a frequency hopping initial location of the extended TTI according to the frequency hopping offset parameter of the extended TTI; and determine the frequency hopping area of the extended TTI according to the frequency hopping initial location of the extended TTI and the length of the frequency hopping area of the extended TTI that are determined.

For example, the determining module 62 is further configured to:

determine a quantity of resource blocks in the frequency hopping area of the extended TTI according to the determined frequency hopping area of the extended TTI and a preset resource block size of the extended TTI; and determine numbers of the resource blocks in the frequency hopping area of the extended TTI according to the quantity of the resource blocks in the frequency hopping area of the extended TTI.

For example, the receiving module 61 is further configured to receive a number of a virtual resource block in which frequency hopping of the extended TTI is located; and the determining module 62 is further configured to:

determine, according to the number of the virtual resource block and a mapping relationship between the number of the virtual resource block and a number of a physical resource block, the number of the physical resource block in which the frequency hopping of the extended TTI is located.

For example, the determining module 62 is specifically further configured to:

determine, according to the number of the virtual resource block, the quantity of the resource blocks in the frequency hopping area, and a timeslot number of the extended TTI, the number of the physical resource block in which the frequency hopping of the extended TTI is located; or determine, according to the number of the virtual resource block, the quantity of the resource blocks in the frequency hopping area, and a subframe number of the extended TTI, the number of the physical resource block in which the frequency hopping of the extended TTI is located.

For example, the determining module 62 is specifically further configured to:

determine, according to the number of the virtual resource block, the quantity of the resource blocks in the frequency hopping area, and a first function $f_m(i)$, the number of the physical resource block in which the frequency hopping of the extended TTI is located, where i indicates a subframe number or a timeslot number of the extended TTI, and the first function $f_m(i)$ is a value determined according to the subframe number or a serial number of current transmission.

For example, the determining module 62 is specifically further configured to:

determine, according to the number of the virtual resource block, the quantity of the resource blocks in the frequency hopping area, the first function $f_m(i)$ a quantity of subbands in the frequency hopping area, and a second function $f_{hop}(i)$, the number of the physical resource block in which frequency hopping of the extended TTI is located, where i indicates a subframe number or a timeslot number of the extended TTI, and the second function $f_{hop}(i)$ is a value recursively determined according to a pseudo-random sequence.

For example, the determining module 62 is further configured to:

acquire a first timeslot-lowest physical resource block $n_{PRB}^{S1}(i)$ according to an indication of downlink control information; and determine, according to the first timeslot-lowest physical resource block $n_{PRB}^{S1}(i)$ that a second timeslot-lowest physical resource block is $(\lfloor N_{RB}^{sb}/2 \rfloor + n_{PRB}^{S1}(i)) \bmod N_{RB}^{sb}$, where $$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases};$$

and $N_{RB}^{HO}=0$, where $N_{RB}^{UL}$ is a quantity of resource blocks in the frequency hopping area of the extended TTI, $N_{sb}$ is a quantity of subbands in the frequency hopping area of the extended TTI, and $N_{RB}^{sb}$ is a quantity of narrowband resource blocks of one subband in the frequency hopping area of the extended TTI.

In this embodiment of the present invention, user equipment receives frequency hopping information, which is sent by a network device, of an extended transmission time interval TTI; and determines a frequency hopping area of the extended TTI according to the frequency hopping information of the extended TTI, where the frequency hopping area of the extended TTI and a frequency hopping area of a normal TTI do not overlap in frequency; and then during M-PUSCH frequency hopping of each extended TTI, the user equipment can hop into a corresponding M-PUSCH frequency hopping area according to a preset frequency hopping pattern, and does not hop into a PUSCH frequency hopping area, so that a resource conflict does not exist when M-PUSCH frequency hopping of an extended TTI and PUSCH frequency hopping of a 1 ms TTI are performed at the same time.

Figure 7:
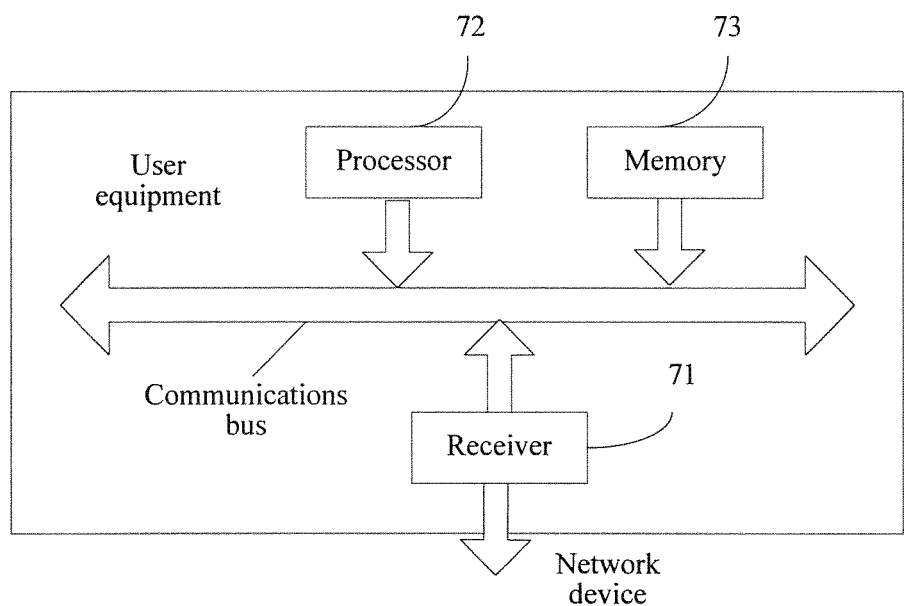
FIG. 7 is a schematic structural diagram of user equipment according to an embodiment of the present invention.

FIG. 7 is a schematic structural diagram of user equipment according to an embodiment of the present invention. As shown in FIG. 7, the user equipment includes:

a receiver 71, configured to receive frequency hopping information, which is sent by a network device, of an extended transmission time interval TTI; and a processor 72, configured to determine a frequency hopping area of the extended TTI according to the frequency hopping information of the extended TTI.

For example, the frequency hopping information of the extended TTI includes a frequency hopping offset parameter of the extended TTI; and the processor 72 is specifically configured to:

determine a frequency hopping initial location of the extended TTI according to the frequency hopping offset parameter of the extended TTI;

determine a length of the frequency hopping area of the extended TTI according to a frequency hopping offset parameter of a normal TTI and the frequency hopping offset parameter of the extended TTI; and determine the frequency hopping area of the extended TTI according to the frequency hopping initial location of the extended TTI and the length of the frequency hopping area of the extended TTI that are determined.

For example, the frequency hopping information of the extended TTI includes a length of a frequency hopping area of the extended TTI; and the processor 72 is specifically configured to:

determine a frequency hopping offset parameter of a normal TTI according to the frequency hopping offset parameter of the normal TTI and the length of the frequency hopping area of the extended TTI;

determine a frequency hopping initial location of the extended TTI according to a frequency hopping offset parameter of the extended TTI; and determine the frequency hopping area of the extended TTI according to the frequency hopping initial location of the extended TTI and the length of the frequency hopping area of the extended TTI that are determined.

For example, the frequency hopping information of the extended TTI includes a frequency hopping offset parameter of the extended TTI and a length of a frequency hopping area of the extended TTI; and the processor 72 is specifically configured to:

determine a frequency hopping initial location of the extended TTI according to the frequency hopping offset parameter of the extended TTI; and determine the frequency hopping area of the extended TTI according to the frequency hopping initial location of the extended TTI and the length of the frequency hopping area of the extended TTI that are determined.

For example, the processor 72 is further configured to:

determine a quantity of resource blocks in the frequency hopping area of the extended TTI according to the determined frequency hopping area of the extended TTI and a preset resource block size of the extended TTI; and determine numbers of the resource blocks in the frequency hopping area of the extended TTI according to the quantity of the resource blocks in the frequency hopping area of the extended TTI.

For example, the receiver 71 is further configured to receive a number of a virtual resource block in which frequency hopping of the extended TTI is located; and the processor 72 is further configured to:

determine, according to the number of the virtual resource block and a mapping relationship between the number of the virtual resource block and a number of a physical resource block, the number of the physical resource block in which the frequency hopping of the extended TTI is located.

For example, the processor 72 is specifically further configured to:

determine, according to the number of the virtual resource block, the quantity of the resource blocks in the frequency hopping area, and a timeslot number of the extended TTI, the number of the physical resource block in which the frequency hopping of the extended TTI is located; or determine, according to the number of the virtual resource block, the quantity of the resource blocks in the frequency hopping area, and a subframe number of the extended TTI, the number of the physical resource block in which the frequency hopping of the extended TTI is located.

For example, the processor 72 is specifically further configured to:

determine, according to the number of the virtual resource block, the quantity of the resource blocks in the frequency hopping area, and a first function $f_m(i)$, the number of the physical resource block in which the frequency hopping of the extended TTI is located, where i indicates a subframe number or a timeslot number of the extended TTI, and the first function $f_m(i)$ is a value determined according to the subframe number or a serial number of current transmission.

For example, the processor 72 is specifically further configured to:

determine, according to the number of the virtual resource block, the quantity of the resource blocks in the frequency hopping area, the first function $f_m(i)$, a quantity of subbands in the frequency hopping area, and a second function $f_{hop}(i)$, the number of the physical resource block in which the frequency hopping of the extended TTI is located, where i indicates a subframe number or a timeslot number of the extended TTI, and the second function $f_{hop}(i)$ is a value recursively determined according to a pseudo-random sequence.

For example, the processor 72 is further configured to:

acquire a first timeslot-lowest physical resource block $n_{PRB}^{S1}(i)$ according to an indication of downlink control information; and determine, according to the first timeslot-lowest physical resource block $n_{PRB}^{S1}(i)$ that a second timeslot-lowest physical resource block is $(\lfloor N_{RB}^{sb}/2 \rfloor + n_{PRB}^{S1}(i)) \bmod N_{RB}^{sb}$, where $$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases};$$

and $N_{RB}^{HO}=0$, where $N_{RB}^{UL}$ is a quantity of resource blocks in the frequency hopping area of the extended TTI, $N_{sb}$ is a quantity of subbands in the frequency hopping area of the extended TTI, and $N_{RB}^{sb}$ is a quantity of narrowband resource blocks of one subband in the frequency hopping area of the extended TTI.

It should be noted that, the user equipment further includes, for example, a memory 73, where an instruction for implementing the foregoing frequency hopping processing method is stored in the memory 73, and the processor 72 invokes the instruction in the memory 73, and can execute the instruction for the frequency hopping processing method, where the receiver 71, the processor 72, and the memory 73 are connected to each other by using a communications bus.

In this embodiment of the present invention, user equipment receives frequency hopping information, which is sent by a network device, of an extended transmission time interval TTI; and determines a frequency hopping area of the extended TTI according to the frequency hopping information of the extended TTI, where the frequency hopping area of the extended TTI and a frequency hopping area of a normal TTI do not overlap in frequency; and then during M-PUSCH frequency hopping of each extended TTI, the user equipment can hop into a corresponding M-PUSCH frequency hopping area according to a preset frequency hopping pattern, and does not hop into a PUSCH frequency hopping area, so that a resource conflict does not exist when M-PUSCH frequency hopping of an extended TTI and PUSCH frequency hopping of a 1 ms TTI are performed at the same time.

Figure 8:
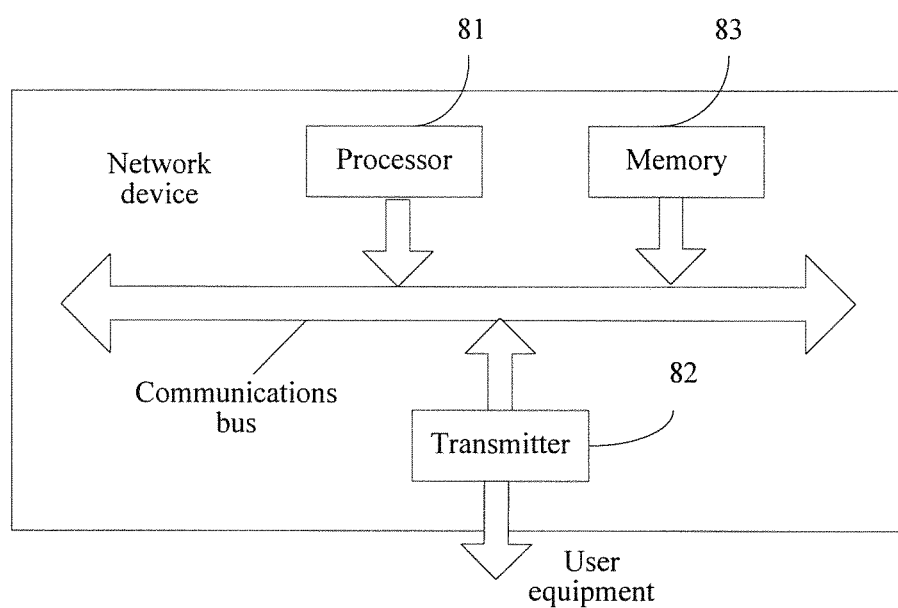
FIG. 8 is a schematic structural diagram of a network device according to an embodiment of the present invention.

FIG. 8 is a schematic structural diagram of a network device according to an embodiment of the present invention. As shown in FIG. 8, the network device includes:

a processor 81, configured to determine frequency hopping information of an extended transmission time interval TTI of user equipment, where the extended TTI is a TTI whose time length is greater than 1 millisecond; and a transmitter 82, configured to send the frequency hopping information of the extended TTI to the user equipment, where the processor 81 is further configured to determine a frequency hopping area of the extended TTI of the user equipment according to the frequency hopping information of the extended TTI.

Optionally, the frequency hopping information of the extended TTI includes a frequency hopping offset parameter of the extended TTI; and the processor 81 is specifically configured to:

determine a frequency hopping initial location of the extended TTI according to the frequency hopping offset parameter of the extended TTI;

determine a length of the frequency hopping area of the extended TTI according to a frequency hopping offset parameter of a normal TTI and the frequency hopping offset parameter of the extended TTI, where the normal TTI is a TTI whose time length is equal to 1 millisecond; and determine the frequency hopping area of the extended TTI according to the frequency hopping initial location of the extended TTI and the length of the frequency hopping area of the extended TTI that are determined.

Optionally, the frequency hopping information includes a length of the frequency hopping area of the extended TTI; and the processor 81 is specifically configured to:

determine a frequency hopping offset parameter of a normal TTI according to the frequency hopping offset parameter of the normal TTI and the length of the frequency hopping area of the extended TTI, where the normal TTI is a TTI whose time length is equal to 1 millisecond;

determine a frequency hopping initial location of the extended TTI according to a frequency hopping offset parameter of the extended TTI; and determine the frequency hopping area of the extended TTI according to the frequency hopping initial location of the extended TTI and the length of the frequency hopping area of the extended TTI that are determined.

Optionally, the frequency hopping information of the extended TTI includes a frequency hopping offset parameter of the extended TTI and a length of a frequency hopping area of the extended TTI; and the processor 81 is specifically configured to:

determine a frequency hopping initial location of the extended TTI according to the frequency hopping offset parameter of the extended TTI; and determine the frequency hopping area of the extended TTI according to the frequency hopping initial location of the extended TTI and the length of the frequency hopping area of the extended TTI that are determined.

Optionally, the processor 81 is further configured to:

determine a quantity of resource blocks in the frequency hopping area of the extended TTI according to the determined frequency hopping area of the extended TTI and a preset resource block size of the extended TTI; and determine numbers of the resource blocks in the frequency hopping area of the extended TTI according to the quantity of the resource blocks in the frequency hopping area of the extended TTI.

Optionally, the processor 81 is further configured to determine, according to a number of a virtual resource block in which frequency hopping of the extended TTI is located and a mapping relationship between the number of the virtual resource block and a number of a physical resource block, the number of the physical resource block in which the frequency hopping of the extended TTI is located.

Optionally, the processor 81 is further configured to:

determine, according to the number of the virtual resource block, the quantity of the resource blocks in the frequency hopping area, and a timeslot number of the extended TTI, the number of the physical resource block in which the frequency hopping of the extended TTI is located; or determine, according to the number of the virtual resource block, the quantity of the resource blocks in the frequency hopping area, and a subframe number of the extended TTI, the number of the physical resource block in which the frequency hopping of the extended TTI is located.

Optionally, the processor 81 is further configured to:

determine, according to the number of the virtual resource block, the quantity of the resource blocks in the frequency hopping area, and a first function $f_m(i)$, the number of the physical resource block in which the frequency hopping of the extended TTI is located, where i indicates a subframe number or a timeslot number of the extended TTI, and the first function $f_m(i)$ is a value determined according to the subframe number or a serial number of current transmission.

Optionally, the processor 81 is further configured to:

determine, according to the number of the virtual resource block, the quantity of the resource blocks in the frequency hopping area, the first function $f_m(i)$, a quantity of subbands in the frequency hopping area, and a second function $f_{hop}(i)$, the number of the physical resource block in which the frequency hopping of the extended TTI is located, where i indicates a subframe number or a timeslot number of the extended TTI, and the second function $f_{hop}(i)$ is a value recursively determined according to a pseudo-random sequence.

Optionally, the processor 81 is further configured to acquire a first timeslot-lowest physical resource block $n_{PRB}^{S1}(i)$ according to an indication of downlink control information; and determine, according to the first timeslot-lowest physical resource block $n_{PRB}^{S1}(i)$ that a second timeslot-lowest physical resource block is $(\lfloor N_{RB}^{sb}/2 \rfloor + n_{PRB}^{S1}(i)) \bmod N_{RB}^{sb}$, where $$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases};$$

and $N_{RB}^{HO}=0$, where $N_{RB}^{UL}$ is a quantity of resource blocks in the frequency hopping area of the extended TTI, $N_{sb}$ is a quantity of subbands in the frequency hopping area of the extended TTI, and $N_{RB}^{sb}$ is a quantity of narrowband resource blocks of one subband in the frequency hopping area of the extended TTI.

It should be noted that, the network device further includes, for example, a memory 83, where an instruction for implementing the foregoing frequency hopping processing method is stored in the memory 83, and the processor 81 invokes the instruction in the memory 83, and can execute the instruction for the frequency hopping processing method, where the transmitter 82, the processor 81, and the memory 83 are connected to each other by using a communications bus.

In this embodiment of the present invention, a network device receives frequency hopping information of an extended transmission time interval TTI; and determines a frequency hopping area of the extended TTI, where the frequency hopping area of the extended TTI and a frequency hopping area of a normal TTI do not overlap in frequency; and then during M-PUSCH frequency hopping of each extended TTI, the network device can hop into a corresponding M-PUSCH frequency hopping area according to a preset frequency hopping pattern, and does not hop into a PUSCH frequency hopping area, so that a resource conflict does not exist when M-PUSCH frequency hopping of an extended TTI and PUSCH frequency hopping of a 1 ms TTI are performed at the same time.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A frequency hopping processing method, comprising:
receiving, by user equipment, frequency hopping information of an extended transmission time interval (TTI) from a network device, wherein the extended TTI is a HI whose time length is greater than 1 millisecond;
determining, by the user equipment, a frequency hopping area of the extended TTI according to the frequency hopping information of the extended TTI;
wherein the frequency hopping information of the extended TTI comprises a frequency hopping offset parameter of the extended TTI; and
determining, by the user equipment, a frequency hopping area of the extended TTI according to the frequency hopping information of the extended TTI comprises:
determining, by the user equipment, a frequency hopping initial location of the extended TTI according to the frequency hopping offset parameter of the extended TTI,
determining a length of the frequency hopping area of the extended TTI according to a frequency hopping offset parameter of a normal TTI and the frequency hopping offset parameter of the extended TTI, wherein the normal TTI is a TTI whose time length is equal to 1 millisecond, and
determining the frequency hopping area of the extended TTI according to the frequency hopping initial location of the extended TTI and the length of the frequency hopping area of the extended TTI that are determined.

2. The method according to claim 1, wherein after determining, by the user equipment, a frequency hopping area of the extended TTI according to the frequency hopping information of the extended TTI, the method further comprises:
determining, by the user equipment, a quantity of resource blocks in the frequency hopping area of the extended TTI according to the determined frequency hopping area of the extended TTI and a preset resource block size of the extended TTI; and
determining, by the user equipment, numbers of the resource blocks in the frequency hopping area of the extended TTI according to the quantity of the resource blocks in the frequency hopping area of the extended TTI.

3. The method according to claim 2, wherein after determining, by the user equipment, numbers of the resource blocks in the frequency hopping area of the extended TTI, the method comprises:
receiving, by the user equipment, a number of a virtual resource block in which frequency hopping of the extended TTI is located; and
determining, by the user equipment according to the number of the virtual resource block and a mapping relationship between the number of the virtual resource block and a number of a physical resource block, the number of the physical resource block in which the frequency hopping of the extended TTI is located.

4. The method according to claim 3, wherein determining, by the user equipment according to the number of the virtual resource block and a mapping relationship between the number of the virtual resource block and a number of a physical resource block, the number of the physical resource block in which the frequency hopping of the extended TTI is located comprises:
determining, by the user equipment according to the number of the virtual resource block, the quantity of the resource blocks in the frequency hopping area, and a timeslot number of the extended TTI, the number of the physical resource block in which the frequency hopping of the extended TTI is located; or
determining, by the user equipment according to the number of the virtual resource block, the quantity of the resource blocks in the frequency hopping area, and a subframe number of the extended TTI, the number of the physical resource block in which the frequency hopping of the extended TTI is located.

5. The method according to claim 3, wherein determining, by the user equipment according to the number of the virtual resource block and a mapping relationship between the number of the virtual resource block and a number of a physical resource block, the number of the physical resource block in which the frequency hopping of the extended TTI is located comprises:
   determining, by the user equipment according to the number of the virtual resource block, the quantity of the resource blocks in the frequency hopping area, and a first function $f_m(i)$, the number of the physical resource block in which the frequency hopping of the extended TTI is located, wherein i indicates a subframe number or a timeslot number of the extended TTI, and the first function $f_m(i)$ is a value determined according to the subframe number or a serial number of current transmission.

6. The method according to claim 5, wherein determining, by the user equipment according to the number of the virtual resource block, the quantity of the resource blocks in the frequency hopping area, and a first function $f_m(i)$, the number of the physical resource block in which the frequency hopping of the extended TTI is located, wherein i indicates a subframe number or a timeslot number of the extended TTI comprises:
   determining, by the user equipment according to the number of the virtual resource block, the quantity of the resource blocks in the frequency hopping area, the first function $f_m(i)$, a quantity of subbands in the frequency hopping area, and a second function $f_{hop}(i)$, the number of the physical resource block in which the frequency hopping of the extended TTI is located, wherein i indicates a subframe number or a timeslot number of the extended TTI, and the second function $f_{hop}(i)$ is a value recursively determined according to a pseudo-random sequence.

7. The method according to claim 1, wherein after determining, by the user equipment, a frequency hopping area of the extended TTI according to the frequency hopping information of the extended TTI, the method further comprises:
   acquiring, by the user equipment, a first timeslot-lowest physical resource block $n_{PRB}^{S1}(i)$ according to an indication of downlink control information; and
   determining, according to the first timeslot-lowest physical resource block $n_{PRB}^{S1}(i)$, that a second timeslot-lowest physical resource block is $(\lfloor N_{RB}^{sb}/2 \rfloor + n_{PRB}^{S1}(i)) \bmod N_{RB}^{sb}$, wherein $$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases};$$

and
$N_{RB}^{HO} = 0$, wherein $N_{RB}^{UL}$ is a quantity of resource blocks in the frequency hopping area of the extended TTI, $N_{sb}$ is a quantity of subbands in the frequency hopping area of the extended TTI, and $N_{RB}^{sb}$ is a quantity of narrowband resource blocks of one subband in the frequency hopping area of the extended TTI.

8. User equipment, comprising:
   a receiver, configured to receive frequency hopping information of an extended transmission time interval (TTI) from a network device;
   a processor, configured to determine a frequency hopping area of the extended TTI according to the frequency hopping information of the extended TTI;
   wherein the frequency hopping information of the extended TTI comprises a frequency hopping offset parameter of the extended TTI; and
   the processor is configured to:
      determine a frequency hopping initial location of the extended TTI according to the frequency hopping offset parameter of the extended TTI,
      determine a length of the frequency hopping area of the extended TTI according to a frequency hopping offset parameter of a normal TTI and the frequency hopping offset parameter of the extended TTI, and
      determine the frequency hopping area of the extended TTI according to the frequency hopping initial location of the extended TTI and the length of the frequency hopping area of the extended TTI that are determined.

9. The user equipment according to claim 8, wherein the processor is further configured to:
   determine a quantity of resource blocks in the frequency hopping area of the extended TTI according to the determined frequency hopping area of the extended TTI and a preset resource block size of the extended TTI; and
   determine numbers of the resource blocks in the frequency hopping area of the extended TTI according to the quantity of the resource blocks in the frequency hopping area of the extended TTI.

10. The user equipment according to claim 9, wherein:
   the receiver is further configured to:
      receive a number of a virtual resource block in which frequency hopping of the extended TTI is located; and
   the processor is further configured to:
      determine, according to the number of the virtual resource block and a mapping relationship between the number of the virtual resource block and a number of a physical resource block, the number of the physical resource block in which the frequency hopping of the extended TTI is located.

11. The user equipment according to claim 10, wherein the processor is further configured to:
   determine, according to the number of the virtual resource block, the quantity of the resource blocks in the frequency hopping area, and a timeslot number of the extended TTI, the number of the physical resource block in which the frequency hopping of the extended TTI is located; or
   determine, according to the number of the virtual resource block, the quantity of the resource blocks in the frequency hopping area, and a subframe number of the extended TTI, the number of the physical resource block in which the frequency hopping of the extended TTI is located.

12. The user equipment according to claim 10, wherein the processor is further configured to:
   determine, according to the number of the virtual resource block, the quantity of the resource blocks in the frequency hopping area, and a first function $f_m(i)$, the number of the physical resource block in which the frequency hopping of the extended TTI is located, wherein i indicates a subframe number or a timeslot number of the extended TTI, and the first function $f_m(i)$ is a value determined according to the subframe number or a serial number of current transmission.

13. The user equipment according to claim 12, wherein the processor is further configured to:

determine, according to the number of the virtual resource block, the quantity of the resource blocks in the frequency hopping area, the first function $f_m(i)$, a quantity of subbands in the frequency hopping area, and a second function $f_{hop}(i)$, the number of the physical resource block in which the frequency hopping of the extended TTI is located, wherein i indicates a subframe number or a timeslot number of the extended TTI, and the second function $f_{hop}(i)$ is a value recursively determined according to a pseudo-random sequence.

14. The user equipment according to claim 8, wherein the processor is further configured to:

acquire a first timeslot-lowest physical resource block $n_{PRB}^{S1}(i)$ according to an indication of downlink control information; and determine, according to the first timeslot-lowest physical resource block $n_{PRB}^{S1}(i)$, that a second timeslot-lowest physical resource block is $(\lfloor N_{RB}^{sb}/2 \rfloor + n_{PRB}^{S1}(i)) \bmod N_{RB}^{sb}$, wherein $$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases};$$

and $N_{RB}^{HO}=0$, wherein $N_{RB}^{UL}$ is a quantity of resource blocks in the frequency hopping area of the extended TTI, $N_{sb}$ is a quantity of subbands in the frequency hopping area of the extended TTI, and $N_{RB}^{sb}$ is a quantity of narrowband resource blocks of one subband in the frequency hopping area of the extended TTI.

* * * * *